Oct. 14, 1969 G. D. FITZHUGH 3,472,490
REMOVABLE ADAPTER FOR WORKING IMPLEMENTS
Filed Aug. 15, 1967 2 Sheets-Sheet 1
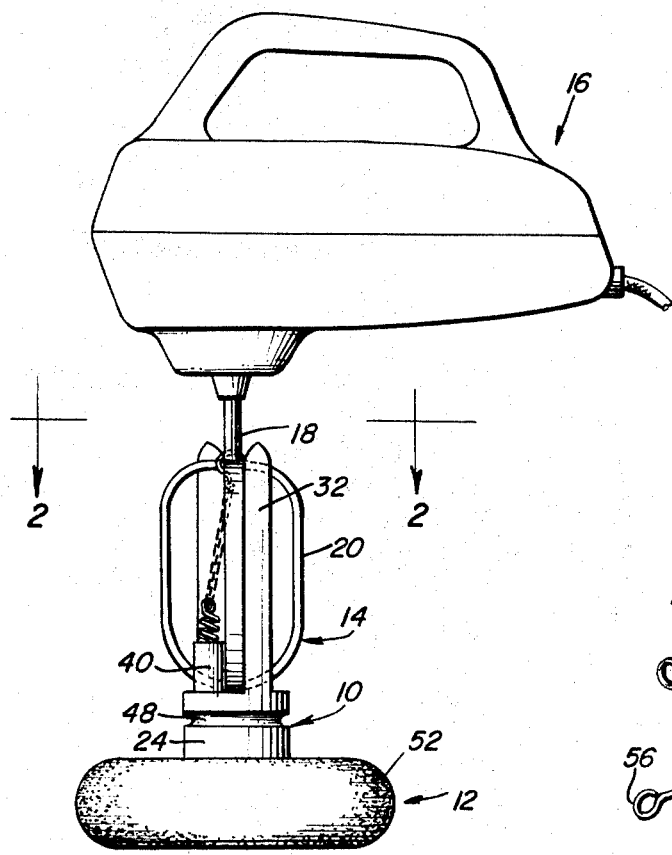
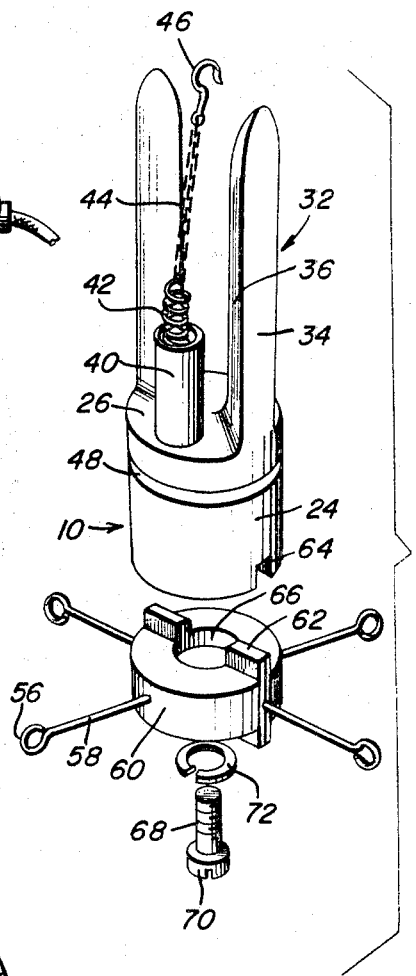
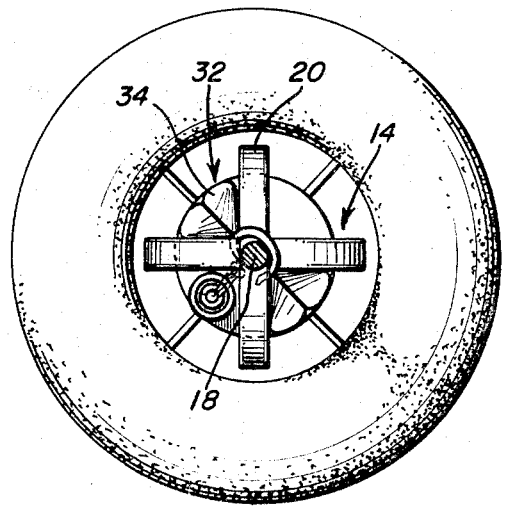
Guy D. Fitzhugh
INVENTOR.

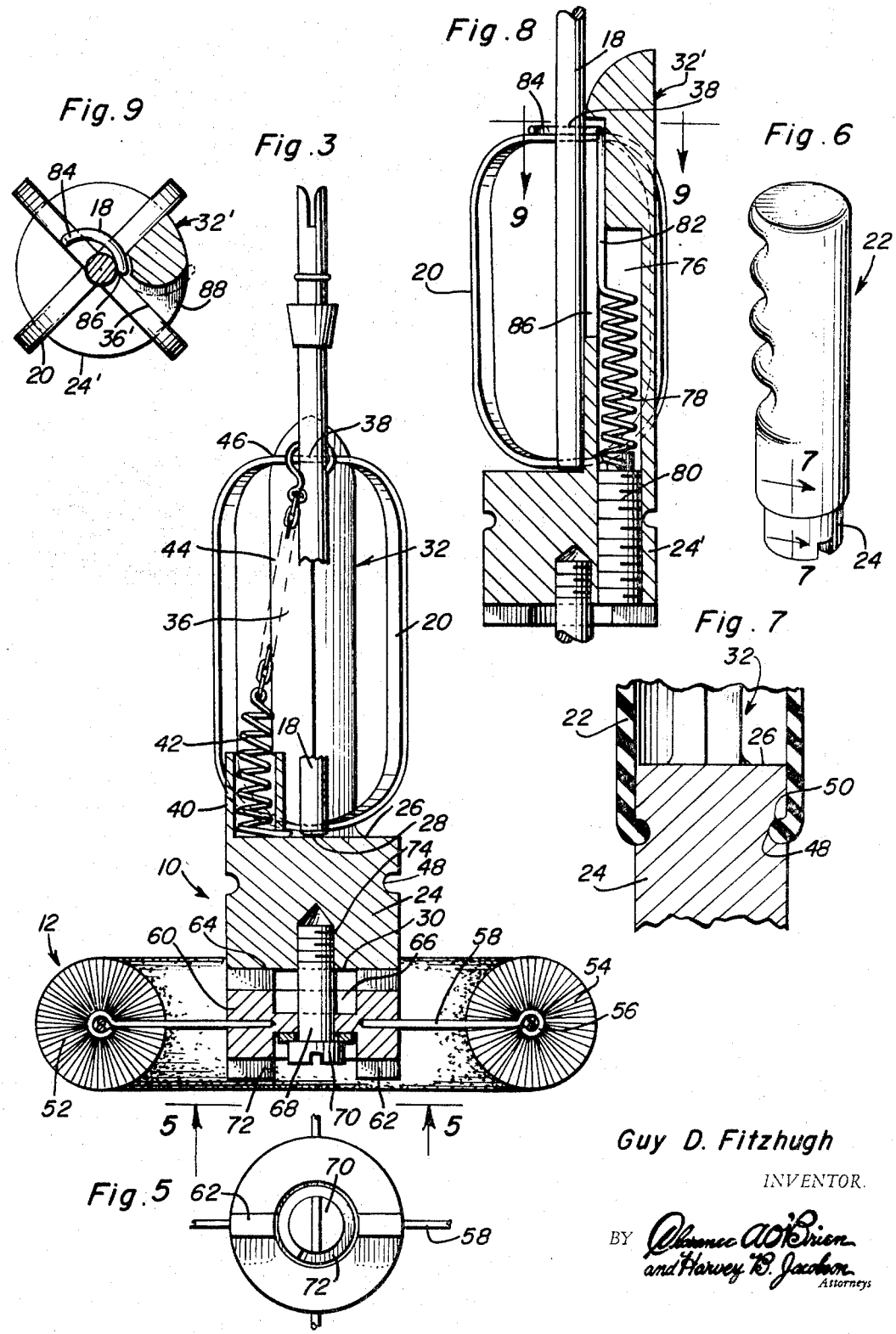

United States Patent Office 3,472,490
Patented Oct. 14, 1969

3,472,490
REMOVABLE ADAPTER FOR WORKING
IMPLEMENTS
Guy D. Fitzhugh, Box 538, Pine Bluff, Ark. 71601
Continuation-in-part of application Ser. No. 523,607,
Jan. 28, 1966. This application Aug. 15, 1967, Ser.
No. 660,797
Int. Cl. B28c 5/08; A47l 11/40
U.S. Cl. 259—1                                    14 Claims

ABSTRACT OF THE DISCLOSURE

An adapter removably attaching working implements such as cleaning brushes to a portable, power driven beater or to a tubular grip handle for alternative powered rotation and manual manipulation. A mounting body is held in abutment with the end of the beater shank and is provided with torque transmitting prongs that extend between and axially beyond the beater blades. These prongs are enclosed within the tubular handle when the handle is locked to the mounting body.

---

This invention relates generally to the attachment of working implements to power driven devices and more particularly to the attachment of working implements to the beater of portable electric mixers such as disclosed in my prior copending application U.S. Ser. No. 523,607, filed Jan. 28, 1966, now Patent No. 3,425,087, issued Feb. 4, 1969, with respect to which the present application is a continuation-in-part.

The present invention represents an improvement over the mounting adapters disclosed in my prior copending application aforementioned in that it extends the versatility of the adapters by rendering it suitable for manual use and thereby avoid the cost of purchasing separate working implements for powered and manual use.

Thus, in accordance with the present invention a mounting adapter is provided having the torque transmitting advantages associated with the adapters disclosed in my prior copending application aforementioned but which may also be readily inserted in enclosing relation into a tubular grip handle for manual manipulation of the cleaning implement attached to the mounting adapter. The adapter features a relatively rigid body having an end face adapted to abut the end of the beater and from which at least two axially elongated prongs extend. The prongs are dimensioned so as to fit between radially extending blades of beaters of different dimensions close to the shank to which the blades are attached in order to transmit torque to the mounting body and the working implement attached thereto with a minimum amount of blade deformation. Toward this end, the torque transmitting prongs extend axially beyond the length of the blade so as to engage the blades at both the end of the beater and at a location spaced from the end at which the blades are attached to the beater shank. Also, the adapter is yieldably held in abutment with the beater by facilities projecting from the mounting body so that it may be enclosed with the prongs within the tubular handle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical portable power operated mixer having a cleaning implement mounted on its beater by an adapter constructed in accordance with the present invention.

FIGURE 2 is a top sectional view taken substantially through a plane indicated by section line 2—2 in FIGURE 1.

FIGURE 3 is a side sectional view through the adapter showing attachment of the cleaning implement thereto and its mounting on the mixer beater.

FIGURE 4 is a perspective view showing some of the disassembled components of the assembly shown in FIGURE 3.

FIGURE 5 is a partial bottom plan view as viewed from a plan indicated by section line 5—5 of FIGURE 3.

FIGURE 6 is a perspective view of the adapter attached to the tubular grip handle.

FIGURE 7 is an enlarged partial sectional view taken substantially through a plane indicated by section line 7—7 in FIGURE 6.

FIGURE 8 is a partial side sectional view showing a modified form of the invention.

FIGURE 9 is a transverse sectional view taken substantially through a plane indicated by section line 9—9 in FIGURE 8.

Referring now to the drawings in detail, it will be observed from FIGURE 1 that the adapter of the present invention generally referred to by reference numeral 10 is utilized to attach a working implement generally referred to by reference numeral 12 to a mixing beater 14 associated with a portable type power mixer 16. The beater 14 is a well-known type commonly available having an elongated shank 18 adapted to be removably inserted into the mixer 16 for powered rotation and having plurality of curved beater blades 20 connected at spaced locations to the shank 18. The working implement 12 as illustrated is of the annular cleaning brush type. It will be appreciated however, that other types of working implements could be utilized. The working implement 12 is removably secured to the adapter 10 which in turn is mounted on the beater 14 in order to transmit powered rotation to the working implement. Alternatively, the implement 12 could be manually manipulated by removal of the adapter 10 from the beater and insertion thereof into a rubber tubular grip handle 22 as illustrated in FIGURE 6.

Referring now to FIGURES 3, 4 and 5, it will be noted that the adapter 10 comprises a cylindrical mounting body 24 made of a suitable rigid material. The mounting body is provided with an abutment end face 26 adapted to engage the beater 14 at one end 28 of the shank 18 to which the beater blades 20 are connected as more clearly seen in FIGURE 3. The end face 30 of the mounting body opposite the end face 26, mounts the working implement 12.

At least two torque transmitting prongs 32 extend from the end face 26 of the mounting body 24 substantially in parallel spaced relation to each other and to the shank 18 of the beater when the adapter is mounted thereon. The prongs are spaced from each other 180° relative to the rotational axis of the shank 18 and the mounting body 24. Each prong is provided with a radially outer surface 34 which is flush with the cylindrical outer surface of the mounting body 24 and with side surfaces 36 which converge radially inwardly so as to engage the sides of adjacent beater blades 20 at the end 28 of the beater shank and at location 38 spaced therefrom where the blades are also attached to the shank. Inasmuch as the outer diameter of the mounting body 24 is less than the outer diameter of the beater 14, the prongs 32 will engage the blades 20 adjacent to the shank 18 to which they are attached at the locations 28 and 38. In view thereof and in view of the engagement of the blades at spaced locations with the prongs, torque will be transmitted to the adapter with a minimum amount of blade deformation.

In order to yieldably hold the adapter mounted on the beater in one form of the invention, a tubular retainer 40 projects axially from the end face 26 and encloses therewithin a coil spring 42 anchored to the mounting body. The coil spring is connected by means of a flexible chain 44 to a hook 46 adapted to engage the blades 20 adjacent to the location 38 on the shank 18 as more clearly seen in FIGURE 3. The coil spring 42 is tensioned when the hook 46 engages the shank as shown so as to yieldably hold the mounting body 24 in abutment with the beater. The tubular retainer 40 will somewhat confine the yieldable anchor formed by the hook, chain and spring so that it may be enclosed together with the prongs 32 within the tubular handle 22 as aforementioned. It will also be apparent that in lieu of a tension spring 42, a compression spring could be used in which case the hook would be connected to the spring by a rigid shank.

The mounting body 24 is provided with an annular groove 48 in axially spaced relation to the end face 26. As shown in FIGURE 7, the annular groove 48 receives the radially inwardly extending locking projection 50 formed adjacent the open end of the tubular handle 22. Thus, when the prongs are inserted into the tubular handle, the handle will be locked to the mounting body in enclosing relation to the prongs and the yieldable anchoring means including the tubular retainer 40. For this reason, the radially outer surfaces 34 of the prongs are made flush with the mounting body 24 in order to guide the open end portion of the tubular handle over the mounting body and to form a backing for the tubular handle.

In the embodiment illustrated, the cleaning implement includes the bristles 52 extending from an annular twisted wire core 54 extending through the eye portions 56 of a plurality of radial spokes 58 extending from a cylindrical mounting block 60 associated with the cleaning implement. The end faces of the mounting block 60 are identical so that the implement may be reversed for attachment to the end face 30 of the mounting body 24. As shown in FIGURES 3, 4 and 5, the block 60 is provided on each face with key projections 62 adapted to be received within slots 64 formed in the end face 30 of the mounting body. A centrally recessed opening 66 is formed in the block 60 so as to receive the shank of a threaded screw fastener 68 with it head 70 and a washer 72 seated in one of the recesses as shown in FIGURE 3. The threaded shank of the screw fastener is threadedly received in an internally threaded bore 74 formed in the mounting body for this purpose. Thus, the implement 12 is readily attached or removed from the mounting body by means of the screw fastener while torque is transmitted to the implement through the slot and projection. It should of course be appreciated that other types of removable attachments could be utilized for securing the working implement to the mounting body 24 depending upon the type of working implement with which it is associated and including snap-on attachments for example.

FIGURES 8 and 9 show another type of yieldable anchoring means for holding the adapter on the beater. In this form of the invention one of the torque transmitting prongs 32' is provided with an internal bore 76 extending from the mounting body 24' to enclose a coil spring 78 anchored to the plug 80. The coil spring is connected to an elongated shank 82 having a hook 84 formed at its upper end for engagement with the beater at location 38 above the blades 20. The hook shank 82 extends through a slot 86 formed in the prong 32' where the side surfaces 36' meet to guide vertical and angular movement thereof. A curved lateral recess 88 extending from the upper end of slot 86 into the side surface 36' receives the hook as shown by dotted line in FIGURE 3 to hold it in a retracted position while the adapter is being inserted between the blades of the beater.

What is claimed as new is as follows:

1. In a combination with a power driven beater having an elongated shank and a plurality of blades connected to the shank at one end and at a location axially spaced therefrom, an adapter for attaching working implements to the beater comprising a mounting body axially abutting the shank at said one end, at least two torque transmitting prongs extending from the body adapted to be received between the blades substantially parallel to the shank of the beater, and yieldably extensible anchoring means mounted on the body and engageable with the blades on a side of said location on the shank remote from said one end of the shank for holding the mounting body in abutment with the one end of the shank.

2. The combination of claim 1 wherein said mounting body comprises a relatively rigid member having an end face engageable with the beater at said one end of the shank and of a diameter less than the outer diameter of the beater blades, and means for removably securing the working implement to the member in axially spaced relation to said one end of the shank.

3. In combination with a power driven beater having an elongated shank and a plurality of blades connected to the shank at one end and at a location axially spaced therefrom, an adapter for attaching working implements to the beater comprising a mounting body, at least two torque transmitting prongs extending from the body adapted to be received between the blades substantially parallel to the shank of the beater, and yieldable anchoring means mounted on the body and engageable with the shank adjacent said location axially spaced from the one end of the shank, said mounting body comprising a relatively rigid member having an end face engageable with the beater at said one end of the shank and of a diameter less than the outer diameter of the beater blades, and means for removably securing the working implement to the member in axially spaced relation to said one end of the shank, said torque transmitting prongs projecting from the end face of the rigid member a distance greater than the axial length of the blades, each of said prongs having a radially outer surface flush with the mounting body and converging side surfaces engageable with adjacent blades of the beater.

4. The combination of claim 3 wherein said yieldable anchoring means comprises a tubular retainer projecting axially from the end face of the mounting body between the torque transmitting prongs and the blades engaged therewith, a spring connected to the mounting body within the tubular retainer, a hook adapted to engage the shank and flexible means connecting the hook to the spring for tensioning the spring to yieldably hold the mounting body in axial abutment with the beater when the hook engages the shank at said location axially spaced from the one end of the shank.

5. The combination of claim 4 wherein said mounting body is provided with an annular groove axially spaced from the prongs, and a tubular handle made of elastic material adapted to be received about the prongs in enclosing relation to the yieldable anchoring means to manually manipulate the working implement secured to the mounting body, said tubular handle having a locking projection adjacent one end adapted to be received in said annular groove in the mounting body.

6. In combination with a power driven beater having an elongated shank and a plurality of blades connected to the shank at one end and at a location axially spaced therefrom, an adapter for attaching working implements to the beater comprising a mounting body, at least two torque transmitting prongs extending from the body adapted to be received between the blades substantially parallel to the shank of the beater, and yieldable anchoring means mounted on the body and engageable with the shank adjacent said location axially spaced from the one end of the shank, said mounting body being provided with an annular groove axially spaced from the prongs, and a tubular handle made of elastic material adapted to be received about the prongs in enclosing relation to the yieldable anchoring means to manually manipulate the working implement secured to the mounting body, said tubular handle having a locking projection adjacent one end adapted to be received in said annular groove in the mounting body.

7. The combination of claim 6 wherein said torque transmitting prongs project from the mounting body a distance greater than the axial length of the blades, each of said prongs having a radially outer surface flush with the mounting body and converging side surfaces engageable with adjacent blades of the beater.

8. An adapter for alternatively attaching a working implement to a power driven beater and a tubular handle, comprising a relatively rigid body having an abutment face of a diameter less than the beater, anchoring means mounted on said abutment face for yieldably holding the body in axial abutment with the beater, axially elongated torque transmitting means projecting from the abutment face for engagement with the beater, and lock means mounted on the rigid body for holding the tubular handle thereon in enclosing relation to the anchoring means and the torque transmitting means.

9. The combination of claim 8 wherein said torque transmitting means comprises at least two substantially parallel prongs, each prong having a radially outer surface flush with the rigid body and side surfaces converging radially inwardly adapted to engage radially extending blades of the beater.

10. In combination with a power driven beater having an elongated shank and a plurality of blades connected to the shank at one end and at a location axially spaced therefrom, an adapter for attaching working implements to the beater comprising a mounting body, at least two torque transmitting prongs extending from the body adapted to be received between the blades substantially parallel to the shank of the beater, and yieldable anchoring means mounted on the body and engageable with the shank adjacent said location axially spaced from the one end of the shank, said yieldable anchoring means comprising a spring connected to the mounting body and extending therefrom generally parallel to the torque transmitting prongs, and a hook connected to the spring.

11. The combination of claim 10 wherein said yieldable anchoring means further includes a tubular retainer projecting axially from the mounting body between the torque transmitting prongs and the blades engaged therewith, said spring being anchored by the tubular retainer, and flexible means connecting the hook to the spring for tensioning the spring to yieldably hold the mounting body in axial abutment with the beater when the hook engages the shank at said location axially spaced from the one end of the shank.

12. The combination of claim 11 wherein said mounting body comprises a relatively rigid member having an end face engageable with the beater at said one end of the shank and of a diameter less than the outer diameter of the beater blades, and means for removably securing the working implement to the member in axially spaced relation to said one end of the shank.

13. The combination of claim 10 including retainer means enclosing the spring for guiding movement of the hook.

14. The combination of claim 13 wherein said retainer means includes means connecting the spring to the mounting body within one of the torque transmitting prongs, said hook being connected to the spring and extending from the prong through a guide slot formed therein.

References Cited

UNITED STATES PATENTS

| | | | |
|---|---|---|---|
| 2,822,562 | 2/1958 | Shackelford | 15—230.16 |
| 3,141,184 | 7/1964 | Notes | 15—97 |
| 3,186,020 | 6/1965 | Redfield | 15—246 XR |

DANIEL BLUM, Primary Examiner

U.S. Cl. X.R.

15—22, 146, 179, 206